US007275901B2

(12) United States Patent
Carroll

(10) Patent No.: US 7,275,901 B2
(45) Date of Patent: Oct. 2, 2007

(54) COMBINATION PASSENGER AND CARGO CARRIER

(76) Inventor: Blaine Carroll, 17 Country Green Dr., Bellport, NY (US) 11713

( * ) Notice: Subject to any disclaimer, the term of this patent is extended or adjusted under 35 U.S.C. 154(b) by 79 days.

(21) Appl. No.: 10/997,663

(22) Filed: Nov. 24, 2004

(65) Prior Publication Data
US 2006/0108818 A1 May 25, 2006

(51) Int. Cl.
B60P 7/00 (2006.01)
(52) U.S. Cl. .................. 410/24.1; 410/24; 410/28; 410/28.1; 296/190.01; 296/166; 296/182.1; 296/26.08; 280/403; 280/433
(58) Field of Classification Search .................. 410/24, 410/26, 28, 24.1, 28.1, 29.1; 296/166, 26.08, 296/190.02, 190.01, 190.08, 182.1; 280/403, 280/410, 408, 433, 499, 411.1, 425.2; 298/8 T
See application file for complete search history.

(56) References Cited

U.S. PATENT DOCUMENTS

| 1,654,492 | A | 12/1927 | Corbin, Jr. | |
| 2,490,162 | A | 12/1949 | Ruelle | |
| 3,285,194 | A | 11/1966 | Clejan | |
| 3,317,236 | A | 5/1967 | Connerat et al. | |
| 3,343,865 | A | 9/1967 | Stuart | |
| 3,503,340 | A | 3/1970 | Warren | 410/24 |
| 3,557,712 | A | 1/1971 | Milenkovic | 105/368 |
| 3,584,584 | A | 6/1971 | Milenkovic | 105/368 |
| 3,785,514 | A | 1/1974 | Forsyth et al. | 214/38 |
| 3,892,188 | A | 7/1975 | Warren | 105/368 |
| 3,933,258 | A | 1/1976 | Forsyth et al. | 214/85 |
| 3,989,119 | A | 11/1976 | Cady | 180/89 |
| 3,993,342 | A | 11/1976 | Jones et al. | 296/1 |
| 4,081,196 | A | 3/1978 | Dandridge, Jr. | 296/1 |
| D249,667 | S | 9/1978 | Thompson | D12/103 |
| 4,195,856 | A | 4/1980 | Larson et al. | 280/81 |
| 4,201,415 | A | 5/1980 | Suchanek | 296/190 |
| 4,227,734 | A | 10/1980 | Cottrell et al. | 410/12 |
| 4,320,811 | A | 3/1982 | Queveau | 180/14 |
| 4,397,496 | A | 8/1983 | Drygas, III | 296/1 |
| 4,420,165 | A | 12/1983 | Goodin | 280/414.1 |
| 4,582,354 | A | 4/1986 | Halim | 296/64 |
| 4,684,142 | A | 8/1987 | Christenson | 280/81 |
| 4,854,631 | A | 8/1989 | Laursen | 296/158 |

(Continued)

FOREIGN PATENT DOCUMENTS

JP 06262976 A 9/1994 .................. 410/26

OTHER PUBLICATIONS

Freightliner, "Business Class M2", 15 pages, http://www.freightlinertrucks.com.

(Continued)

Primary Examiner—Stephen Gordon
(74) Attorney, Agent, or Firm—Alfred M. Walker; Frank Tolin; Mark E. Bender

(57) ABSTRACT

A transport system having a chassis; a body mounted on the chassis, where the body includes a cabin for transporting at least one passenger; a cabin for the driver; a tandem coupled to the chassis; a drop frame secured to the chassis where the drop frame is below and behind the tandem; and a fifth wheel secured to the drop frame. In various embodiments, the driver cabin and the passenger cabin together form a unitary compartment.

14 Claims, 13 Drawing Sheets

U.S. PATENT DOCUMENTS

| | | | |
|---|---|---|---|
| 5,071,298 A * | 12/1991 | Conzett | 410/27 |
| 5,102,184 A | 4/1992 | Cook | 296/158 |
| 5,310,239 A * | 5/1994 | Koske et al. | |
| 5,314,200 A | 5/1994 | Phillips | 296/181 |
| 5,527,138 A | 6/1996 | Flores et al. | 410/29.1 |
| 5,562,374 A | 10/1996 | Plamper | 410/66 |
| 5,785,372 A | 7/1998 | Glatzmeier et al. | 296/24.1 |
| 5,863,070 A | 1/1999 | Williams et al. | 280/781 |
| 5,889,627 A | 3/1999 | Englander et al. | 359/864 |
| 5,893,692 A | 4/1999 | Asanuma | 410/83 |
| 5,899,656 A | 5/1999 | Rahe et al. | 410/24 |
| 5,921,615 A | 7/1999 | Gimenez | 296/164 |
| 5,947,550 A | 9/1999 | Mehren et al. | 296/188 |
| 6,135,532 A | 10/2000 | Martin | 296/61 |
| 6,241,308 B1 | 6/2001 | Gaspard, II et al. | 296/178 |
| 6,336,676 B2 | 1/2002 | Gaspard, II et al. | 296/178 |
| 6,538,612 B1 | 3/2003 | King | 343/757 |
| 6,540,285 B2 | 4/2003 | Crean | 296/204 |
| 6,554,348 B1 | 4/2003 | Gernstein | 296/178 |
| 2004/0062620 A1 | 4/2004 | Deets | 410/4 |

OTHER PUBLICATIONS

Jake's Truck Shop Inc., "Cottrell, Inc. C-4808", Dec. 31, 1999, 1 page, http://www.jakestruckshop.com/Products/Trailer/Inventory/20010228.htm.

Roads and Traffic Authority of New South Wales, "Fifth Wheel Mountings", May 1998 No. 23, 6 pages.

U.S. Department of Transportation, "Federal Motor Carrier Safety Administration, Regulations § 390.5 Definitions", Dec. 31. 1999, 7 pages, www.fmcsa.dot.gov/ruleregs/fmcsr/regs/390.5.htm.

U.S. Department of Transportation, "Federal Motor Carrier Safety Administration, Regulations § 658.5 Definitions", Dec. 31, 1999, 7 pages, www.fmcsa.dot.gov/ruleregs/fmcsr/regs/658.5.htm.

* cited by examiner

COMBINATION PASSENGER AND CARGO CARRIER

BACKGROUND OF THE INVENTION

1. Field of the Invention

This invention relates generally to a passenger/freight carrier and more specifically to a vehicle capable of carrying passenger(s), vehicle(s), cargo, and/or other vehicles simultaneously.

2. Description of the Related Art

As indicated in Deets (U.S. patent application Ser. No. 10/256,688, filed Sep. 29, 2002 (Publication No. 2004/0062620, published, Apr. 1, 2004, now U.S. Pat. No. 6,830,417, dated Dec. 14, 2004), improvements to the interstate highway system, the decline in available passenger rail service, and increased safety concerns over air travel, travelers are electing with increasing frequency, for both business and pleasure, to utilize ground transportation to travel to their destination.

Depending upon the distance traveled, driving one's personal vehicle to the destination may add significant wear and tear to the vehicle, as well as leave the driver fatigued at the end of the journey. Shipping the vehicle separately saves wear and tear on the vehicle, however, the vehicle's operator may arrive at the destination prior to the vehicle, creating logistical problems and wasting time for the operator. Although transportation modes have attempted to solve these logistical problems by transporting the vehicle and operator together, other related problems still exist.

For example, related patents include Gaspard, II et al. (U.S. Pat. No. 6,336,676, issued Jun. 5, 2001) ("Gaspard") which discloses a modified "double-decker" bus capable of transporting passengers; and/or a cargo container or a unitary vehicle simultaneously. In Gaspard, the engine is positioned at either the rear of the passenger compartment or under the passenger compartment.

The prior art typically uses a high fifth wheel configuration. The high fifth wheel configuration places the fifth wheel directly above the rear most axles (also known as a "tandem"). One of the problems associated with the use of the high fifth wheel configuration is jack-knifing. Jack-knifing occurs when a tractor driver looses control of a tractor and trailer. For example, jack-knifing can occur on slippery road conditions when a tractor driver applies the tractor brakes too hard. As a result, the driver often looses control of the tractor steering axle. To regain control of the steering axle, the driver can "let off" of the brakes. In addition, insufficient lubrication of the fifth wheel increases the likelihood of jack-knifing and its effects.

Another related patent is Drygas, III (U.S. Pat. No. 4,397,496, issued Aug. 9, 1983) ("Drygas"). Drygas discloses a commonly enclosed driver and passenger compartment. Drygas also discloses an enclosed trailer, for transporting vehicles, coupled to the enclosed driver and passenger compartment via a high fifth wheel configuration. However, the enclosed trailer disclosed in Drygas only transports five vehicles. Further, Drygas does not disclose placing vehicles above the passenger compartment.

In Deets, U.S. patent application Ser. No. 10/256,688, filed Sep. 29, 2002 (Publication No. 2004/0062620, published Apr. 1, 2004, now U.S. Pat. No. 6,830,417, dated Dec. 14, 2004), there is described a vehicle carrier for simultaneously transporting vehicle(s) and passenger(s). The disclosed method and device utilize a tractor coupled to a trailer. Deets discloses various ways in which the tractor is coupled to the trailer. For example, the coupling means is limited to, in one embodiment, a hitch mounted to and supported by the tractor chassis for attaching the vehicle transport unit to the passenger tractor cab unit; and in another embodiment, the hitch is removed and replaced by decking of sufficient strength to support and transport a load of vehicles. The disclosed device uses a hitch or a high fifth wheel configuration, i.e., a fifth wheel located above the rear axles (the tandem). In either embodiment, the trailer is coupled to the tractor by positioning a portion of the trailer above the deck of the tractor. Such a configuration has limitations, such as for example: a limited turning radius; and a susceptibility to jack-knifing when the driver looses control of the tractor and trailer.

SUMMARY OF THE INVENTION

These and other deficiencies of the prior art are addressed by this invention of transportation system which utilizes a lower fifth wheel to simultaneously transport passenger and their cargo (e.g., their vehicles). In one embodiment, the transport system includes a chassis; a body mounted on the chassis, where the body a cabin for transporting at least one passenger; a cabin for a driver; a tandem coupled to the chassis; a drop frame secured to the chassis where the drop frame is below and behind the tandem; and a fifth wheel secured to the drop frame. In various embodiments, the driver cabin and the passenger cabin together form a unitary compartment.

BRIEF DESCRIPTION OF THE DRAWINGS

So that the manner in which the above recited features of this invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

A passenger/freight carrier for transporting passenger(s), vehicle(s), and/or freight simultaneously is described. In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

Figure 1:
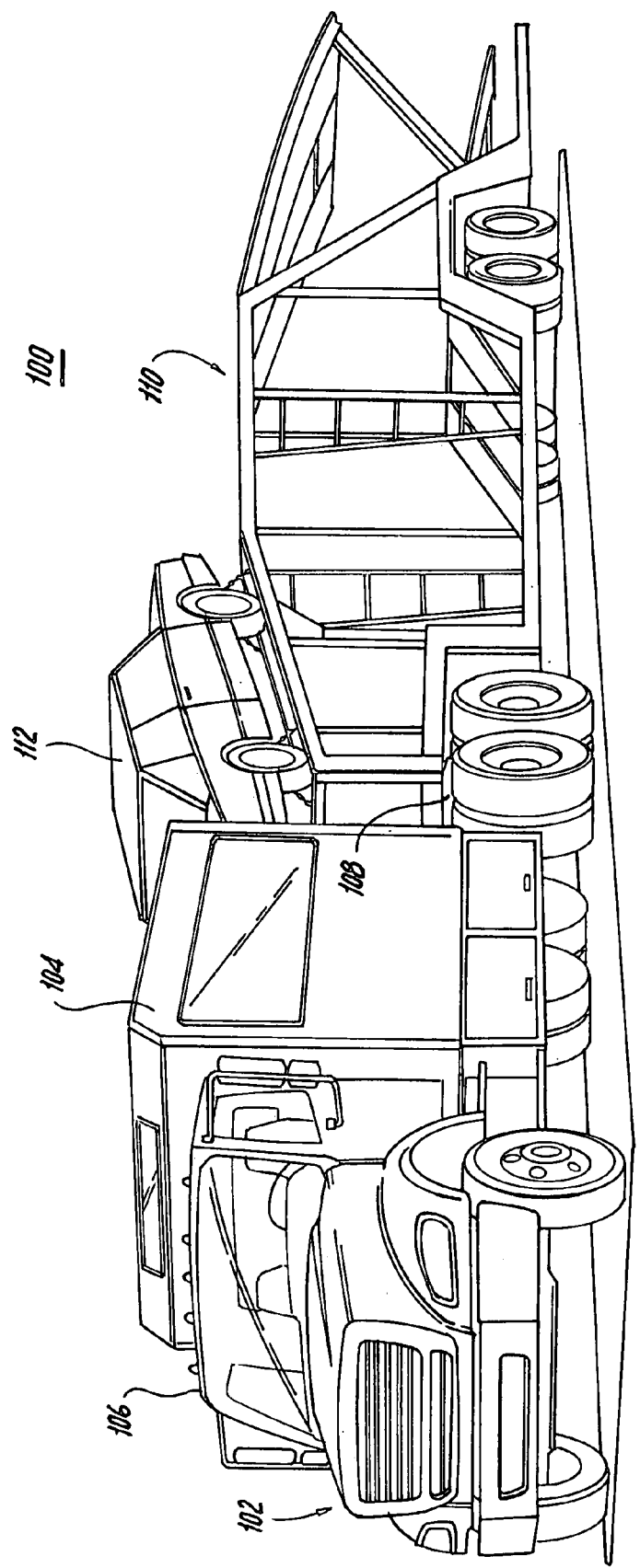
FIG. 1 is a perspective view of a vehicle carrier as used in the prior art.

FIG. 1 is a perspective view of a vehicle carrier 100 as used in the prior art. The vehicle carrier 100 includes a tractor 102 and a trailer 110. The tractor 102 includes a driver compartment 106 and a passenger cabin 104. For illustrative purposes, the trailer 110 is depicted as having a vehicle 112 mounted thereon. The tractor 102 is coupled to the trailer 110 by a high fifth wheel 108. The current length limit, set by U.S. federal law, on the type of vehicle carrier depicted in FIG. 1 is 65 feet.

Figure 2:
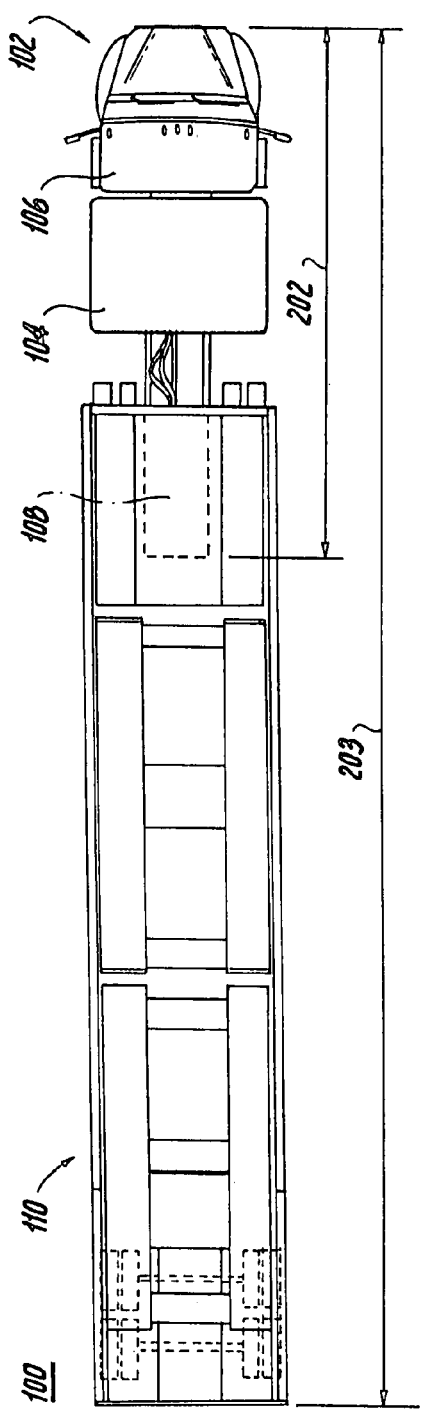
FIG. 2 is a top view of the prior art vehicle carrier depicted in FIG. 1.

FIG. 2 is a top view of the prior art vehicle carrier depicted in FIG. 1. Various elements depicted in FIG. 2 have already been described with respect to FIG. 1. As a result, a description of previously described elements is not repeated. In addition to those elements already described, FIG. 2 also depicts the position of the high fifth wheel 108 with respect to a length 203 of the system 100 and with respect to a length 202 of the high fifth wheel 108 to the driver compartment 106. Note also that in the high fifth wheel 108 configuration, the high fifth wheel 108 is positioned directly under a portion of the trailer 110.

Figure 3:
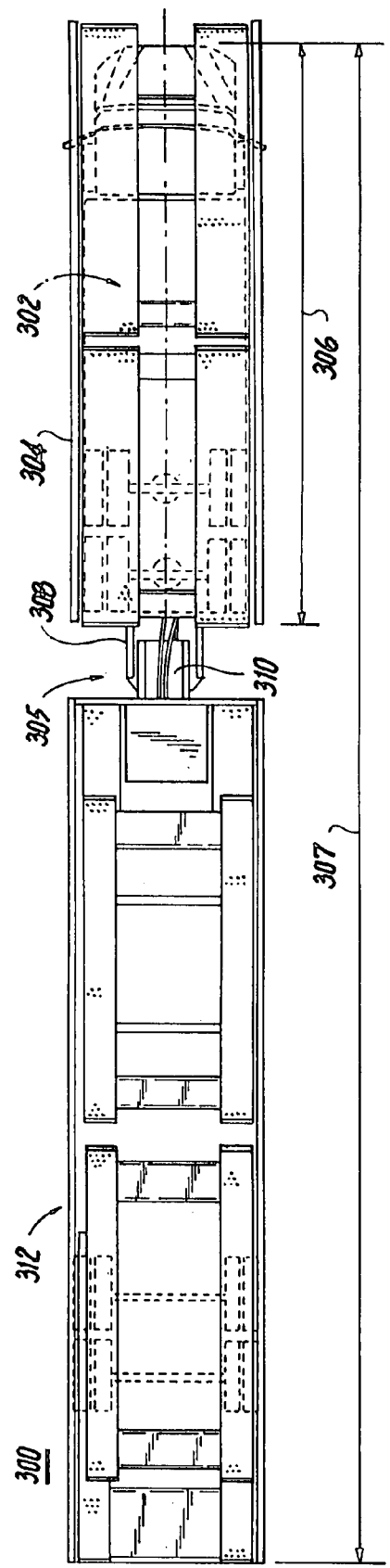
FIG. 3 depicts a top view of an embodiment of the invention.

In contrast to the prior art shown in FIGS. 1 and 2, FIG. 3 depicts a top view of an embodiment 300 of this invention. For clarity, prior art FIG. 2 is juxtaposed with the embodiment of the invention depicted in FIG. 3. Returning to FIG. 3, system 300 includes a tractor 302 coupled to a trailer 312 via a lower fifth wheel (also referred to herein as a "stinger") configuration 305. Generally, a stinger configuration is defined as a configuration where the fifth wheel is located on a drop frame located behind and below the rear-most axles (a.k.a. tandem) of the power unit (i.e., the driving force provided by an engine and drive-train).

The tractor 302 includes a head-rack 304 and passenger cabin (not shown in FIG. 3 but described in detail below). The length of the tractor 302, passenger cab, and head-rack 304 is denoted by lead line 306.

The stinger configuration 305 is a configuration having a drop frame 308 attached to the rear of a deck of the tractor 302; and a support plate 310 attached to the trailer 312. For illustrative purposes, the trailer 312 depicted in FIG. 3 has a capacity of five to eight vehicles. However, the illustrative capacity of the trailer 312 depicted is not intended in any way to limit the scope of the invention. Currently, the U.S. Federal government sets a length limit to seventy-five feet for a tractor and trailer which uses the stinger configuration. However, the length limit set by the U.S. Federal government does not limit the scope or limit the invention. Presently, under current U.S. law, a tractor and trailer using the stinger configuration can be longer than a tractor and trailer using the high fifth wheel configuration. The tractor and trailer of this invention also has a configuration which minimizes the chances of jack-knifing which may occur when a high fifth wheel configuration is used.

Figure 4:
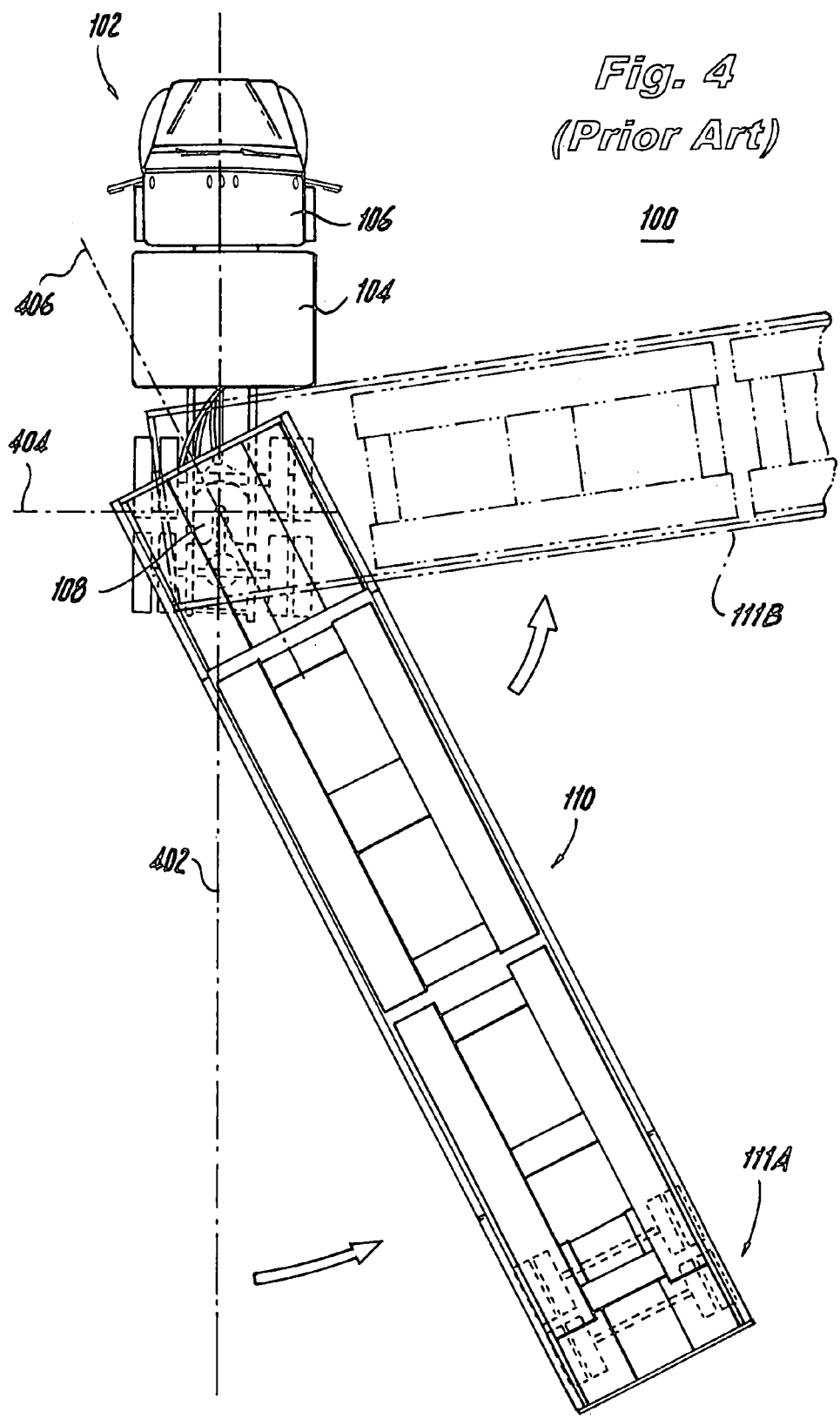
FIG. 4 depicts a top view of lateral movement of a tractor and trailer functioning in accordance with the prior art vehicle carrier depicted in FIGS. 1 and 2.

FIG. 4 depicts a top view of lateral movement of a tractor and trailer functioning in accordance with the prior art vehicle carrier depicted in FIGS. 1 and 2. Specifically, FIG. 4 depicts the tractor and trailer beginning to jack-knife.

The tractor 102 has a longitudinal axis 402. In an initial position (not shown) the trailer 110 has the same longitudinal axis. When slippery conditions occur, and an operator of the tractor 102 and trailer 110 improperly applies the brakes (e.g., applies the brakes too hard) the trailer 110 moves in a lateral direction. For example, the trailer 110 moves laterally towards position 111A. If the operator of the tractor 102 and trailer 110 is unable to regain control, the trailer will continue to move laterally towards axis 404. Axis 404 is substantially perpendicular to axis 402. If the operator is unable to regain control, before the trailer 110 is substantially parallel with axis 404, then the tractor 102 and trailer 110 will jack-knife into position 111 B.

Figures 5, 5A:
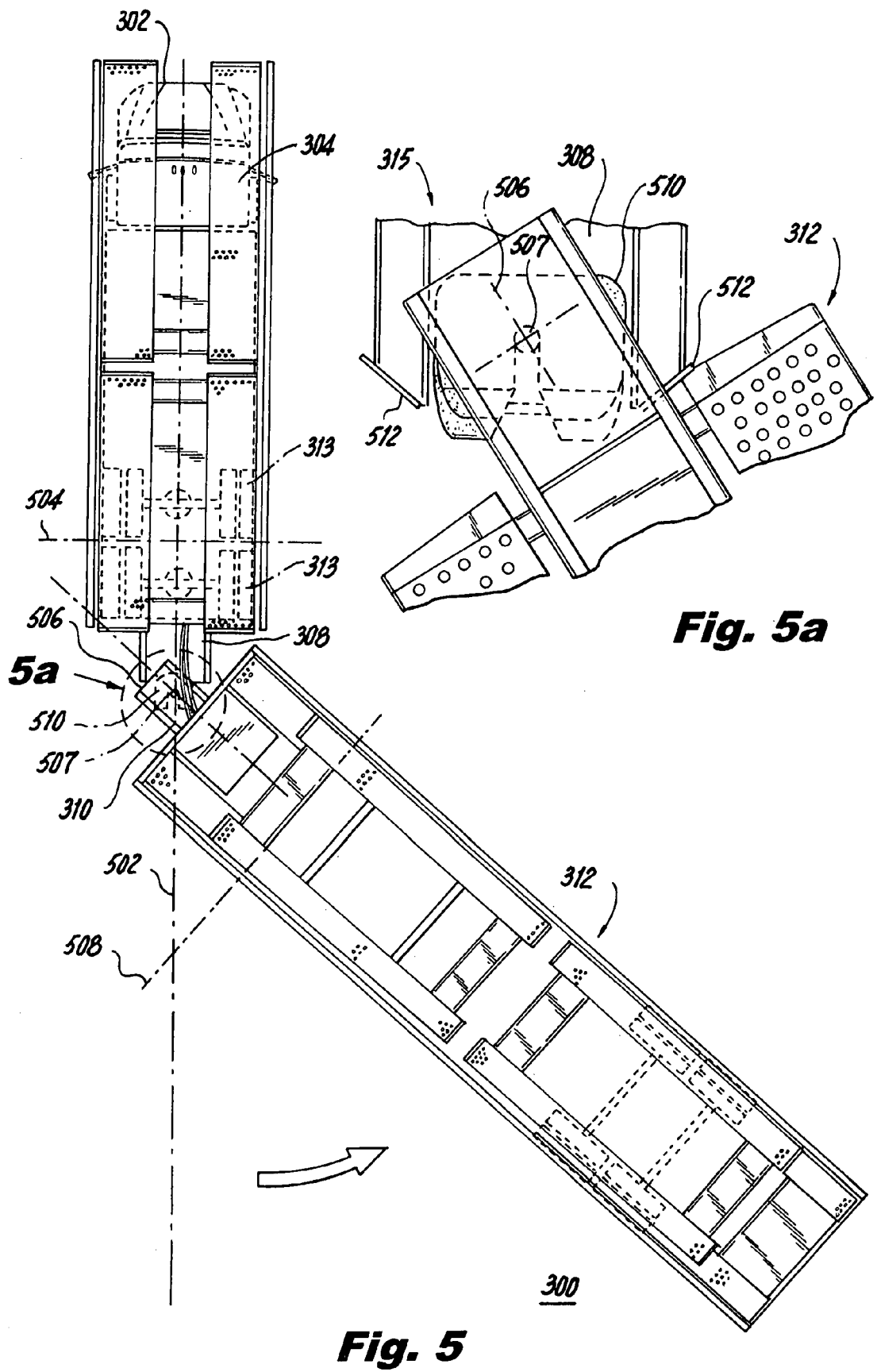
FIG. 5 depicts a top view of lateral movement of a tractor and trailer functioning in accordance with the embodiment of the invention depicted in FIG. 3.
FIG. 5A depicts a close up perspective view of a lower fifth wheel "stinger" encircled 5A in FIG. 5 and used in accordance with the invention.

FIG. 5 depicts a top view of lateral movement of a tractor 302 and trailer 312 functioning in accordance with the embodiment 300 of the invention depicted in FIG. 3. The tractor 302 has a longitudinal axis 502 and a substantially perpendicular axis 504. When the operator improperly applies the brakes, the trailer 312 moves laterally. The trailer pivots about the kingpin 507. Because the kingpin 507 is not directly above the tandem 313, the trailer 312 has a longitudinal axis 506 and perpendicular axis 508 independent of the axis above the tandem 313. Thus, do to the laws of physics, when the trailer 312 moves laterally, the longitudinal axis 506 will try to align itself with the longitudinal axis 502 of the tractor. The alignment thus helps to prevent the tractor 302 from moving substantially perpendicular to the tractor 502. In addition, other embodiments of the invention can incorporate stopper blocks (described in greater detail below) to also help to prevent jack-knifing.

FIG. 5A depicts a close up perspective view of the stinger encircled 5A in FIG. 5 and used in accordance with the invention. The stinger configuration 305 includes a sub-frame 308 supporting a trailer tongue 310.

The sub-frame 308 is mounted below and behind the tandem 313 of the tractor 302. The sub-frame 308 includes a fifth wheel 510 secured thereto and stopper blocks 512 on either side of the sub-frame 308. The stopper blocks 512 are angled so that when the trailer 312 moves laterally (i.e., forming a non-180 degree angle) with respect to the tractor 302, the trailer 312 abuts the angled portion of the stopper blocks 512. As a result, the stopper blocks 512 help to limit the lateral movement of the trailer 312. Illustratively, the trailer 312 is shown in abutment with one of the stopper blocks 512.

The trailer tongue 310 has a kingpin 507 which resides in an interior cavity of the low fifth wheel 510. The kingpin 507 is pivotable within the interior cavity and allows the trailer 312 to pivot with respect to the tractor when desired or necessary.

Figure 6:
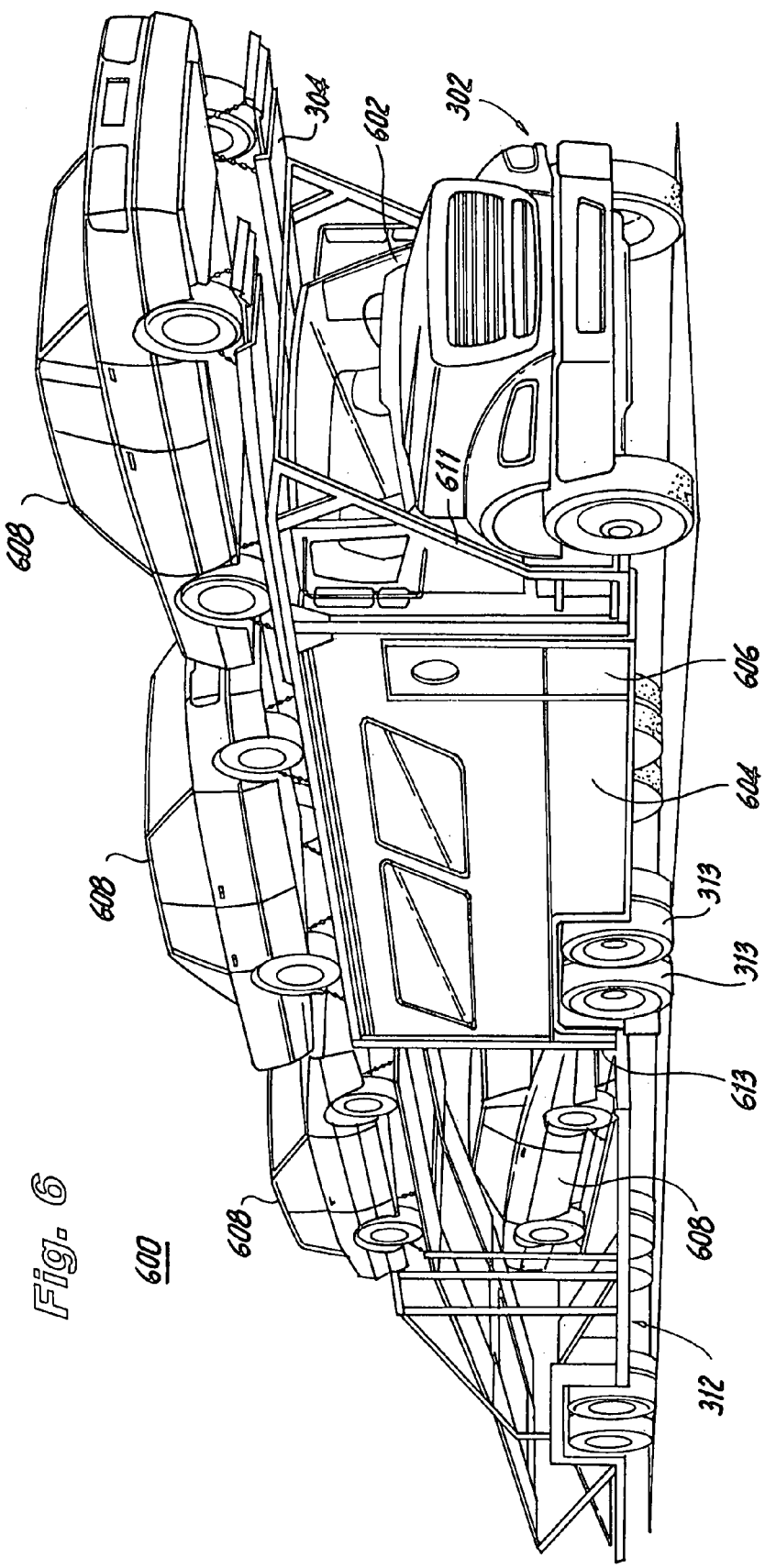
FIG. 6 depicts a side perspective view of another embodiment of the invention.

FIG. 6 depicts a side perspective view of another embodiment 600 of the invention. System 600 includes a tractor 302 coupled to a trailer 312 via a stinger configuration (although the stinger configuration is not viewable in FIG. 6); a driver cabin 602; a passenger cabin 604; and a head-rack 304. The stinger configuration is mounted to the tractor 302 behind and below the tractor tandem 313.

In addition to supporting vehicles, the head-rack 304 acts as a protective reinforcement frame when the tractor 302 is in an accident. As such, the head-rack 304 can be formed of high tensile steel or an equivalent material. For illustrative purposes, the head-rack 304 and the trailer 312 are each depicted as supporting two vehicles 608. To provide further structural support, the head-rack 304 also includes front side rails 611 and rear side rails 613 to protect the tractor 302 from harm in the event of an accident. Front side rails 611 and rear side rails 613 may also be formed of high tensile steel or an equivalent material.

The driver cabin 602 includes a passageway 609 which provides direct access between the driver cabin 602 and the passenger cabin 604. The passenger cabin 604 includes optional windows 612 and a door 606 enclosing a staircase 606a for allowing outside access to and from the passenger cabin 604.

Figure 7:
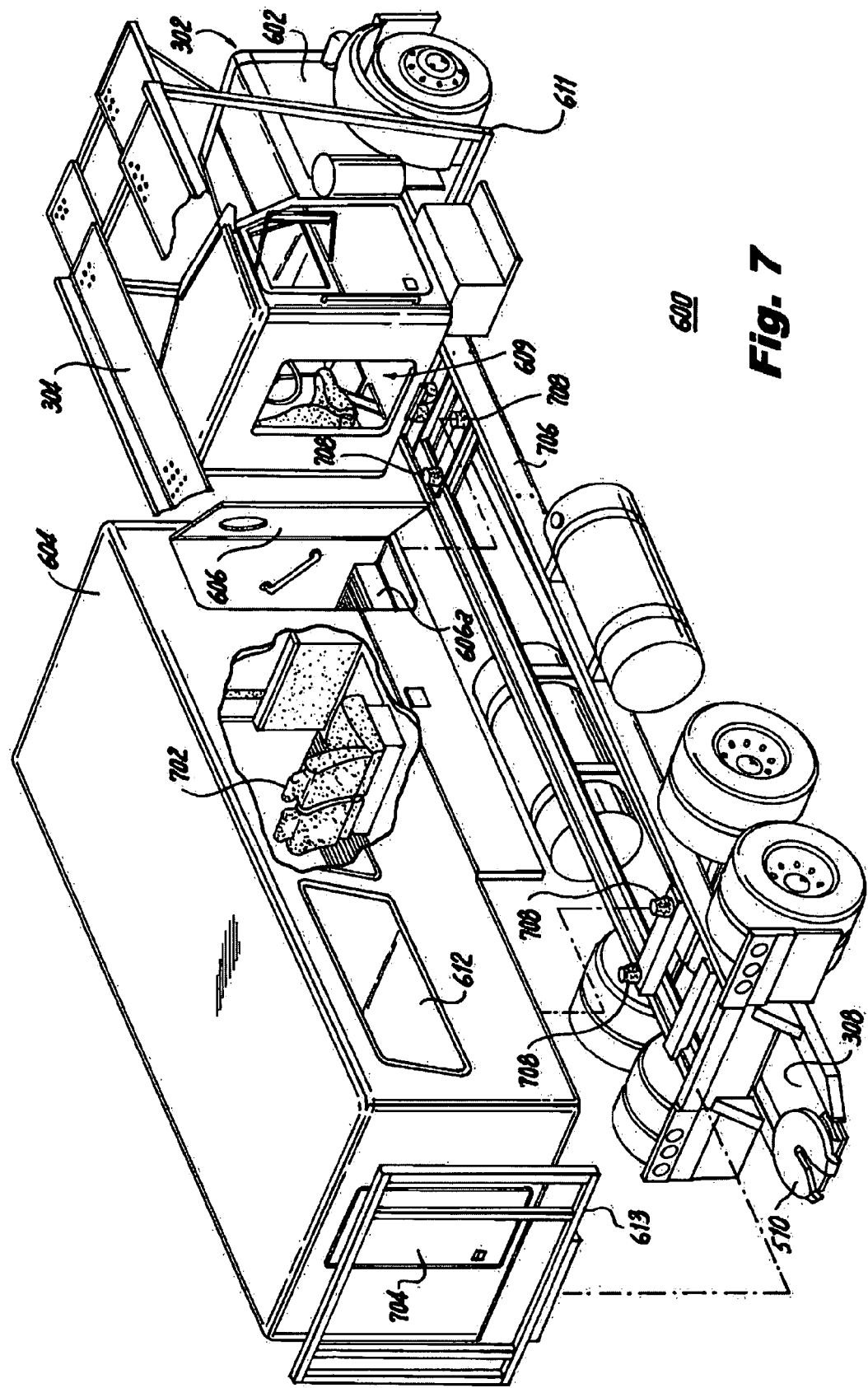
FIG. 7 depicts an exploded view of the embodiment of the invention depicted in FIG. 6.

FIG. 7 depicts an exploded view of the embodiment 600 of the invention depicted in FIG. 6. Specifically, passenger cabin 604 and rear side rail 613 is shown exploded from the tractor 302; and the head-rack 304 is partially cut away.

The passenger cabin 604 includes chairs 702 therein. In addition, the passenger cabin 604 can optionally include such items as a bed(s), a television(s), a lavatory, and a table(s). The passenger cabin 604, when exploded reveals a support frame 706 for supporting the passenger cabin 604 and multiple air bags and shocks 708 to help provide a comfortable ride.

Figure 8:
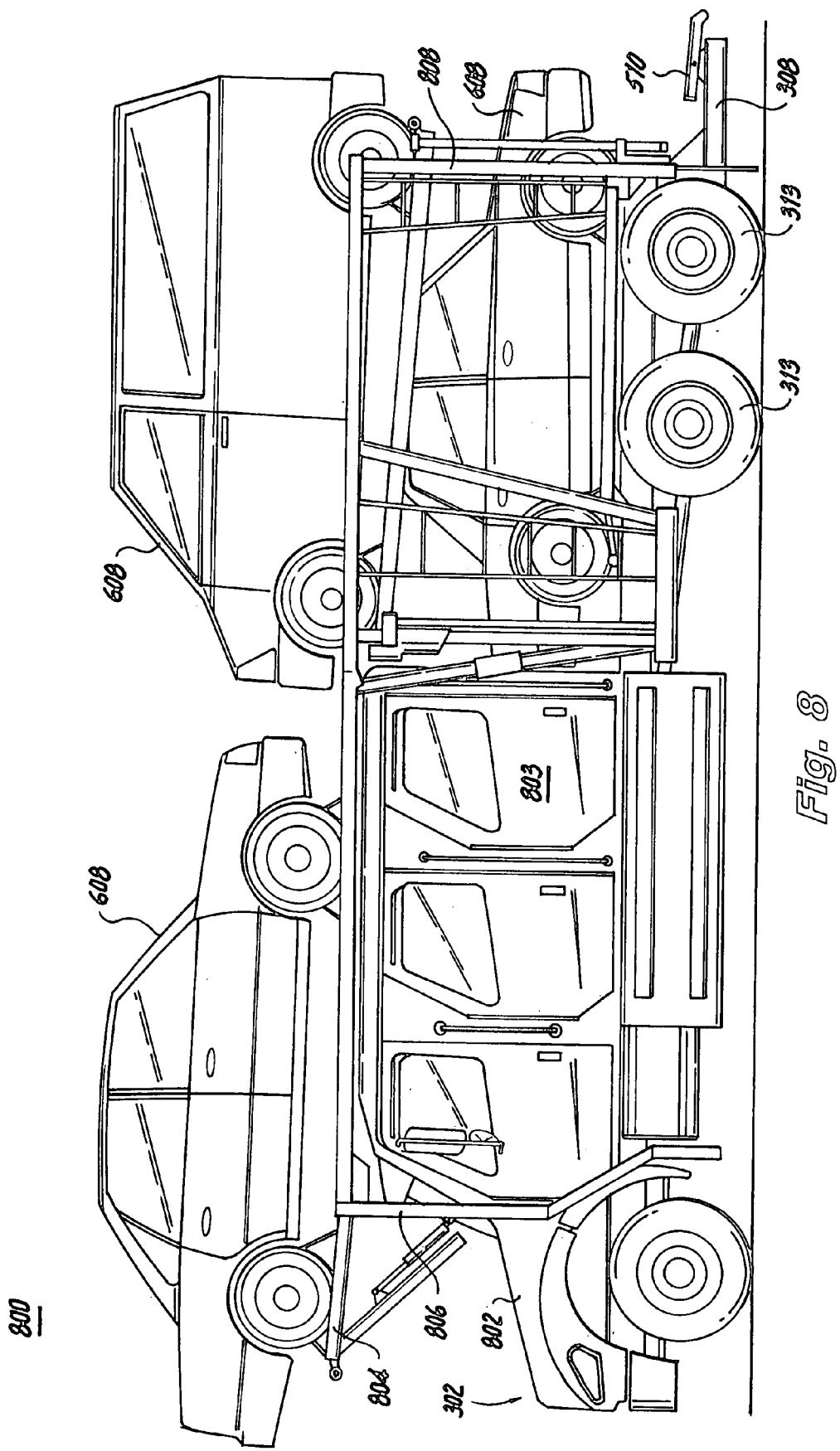
FIG. 8 depicts a side view of a different embodiment 800 of the invention.

FIG. 8 depicts a side view of a different embodiment 800 of the invention. Embodiment 800 includes a tractor 302 having a driver cabin 802 with a crew cab 803 and the lower fifth wheel 510 mounted to the drop frame 308. The drop frame 308 is behind and below the tandem 313. Illustratively, the crew cab 803 includes doors which allow access to additional seating (e.g., two additional rows of seating). However, it is appreciated that the crew cab 803 can include more or less doors for access to at least one seat located in the crew cab 803.

In addition, embodiment 800 includes a head-rack 304, front support guard 806, rear support guard 808, and a hydraulic extension 804. The hydraulic extension 804 moves at an angle with respect to the head-rack 304. Thus, the hydraulic extension 804 allows greater clearance when in a lowered position and greater access to the engine compartment when in a raised position.

The embodiment 800 depicted in FIG. 8 operates similarly as the embodiment 600 depicted in FIG. 6 except that embodiment 800 includes the crew cab 803; the configuration of the front support guard 806, rear support guard 808, and hydraulic extension 804.

Figure 9:
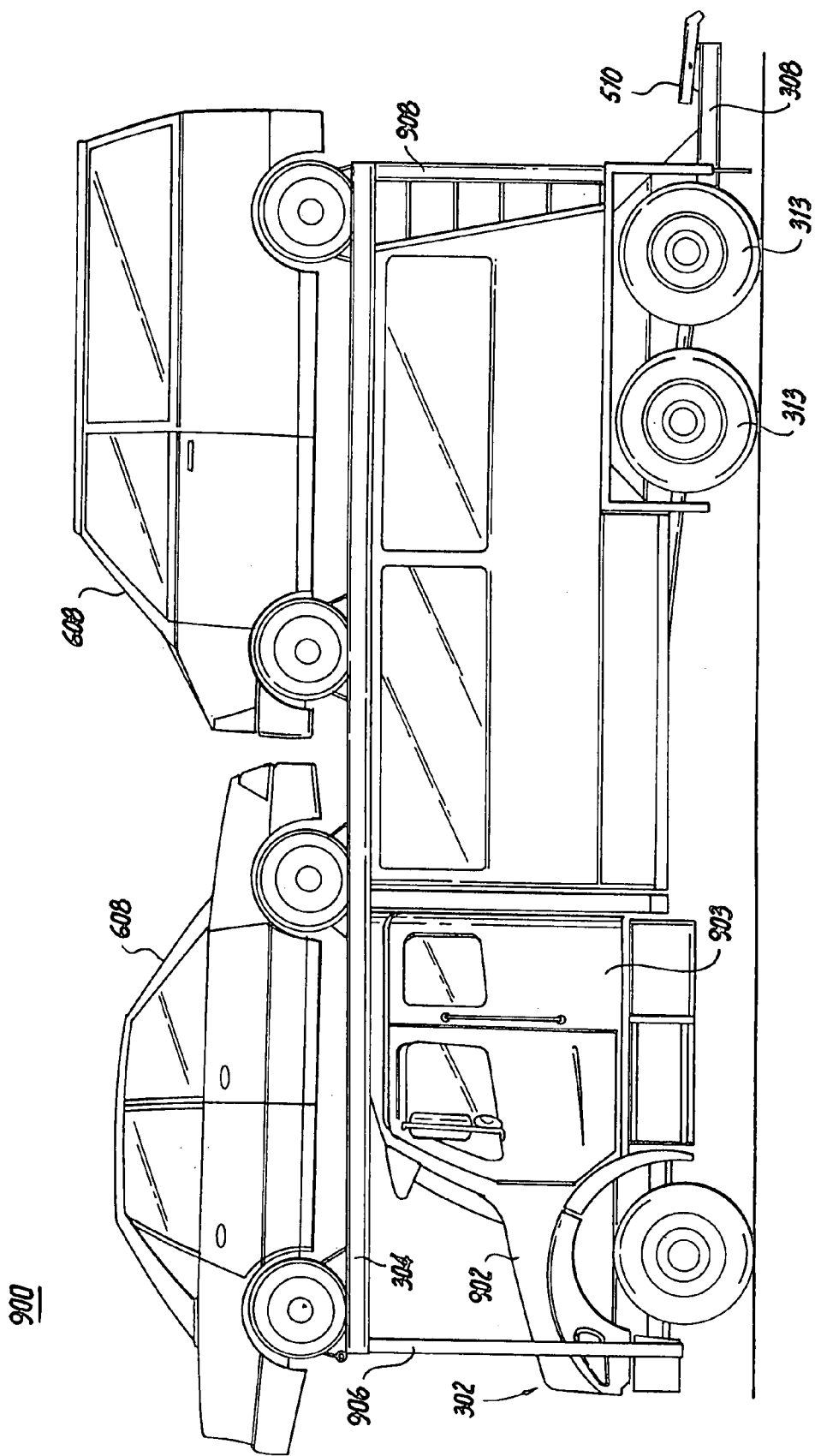
FIG. 9 depicts a side view of yet another embodiment of the invention.

FIG. 9 depicts a side view of yet another embodiment 900 of the invention. Embodiment 900 includes a tractor 302 having a driver cabin 902 with an extension 903 and the lower fifth wheel 510 mounted to the drop frame 308. The drop frame 308 is behind and below the tandem 313. The driver cabin 902 and extension 903 together form an extended driver cabin. In addition, embodiment 900 includes a head-rack 304, front support guard 906 and rear support guard 908. The embodiment 900 depicted in FIG. 9 operates similarly as the embodiment 600 depicted in FIG. 6 except that embodiment 900 includes the extension 903; and the configuration of the front support guard 906 and rear support guard 908.

Figure 10:
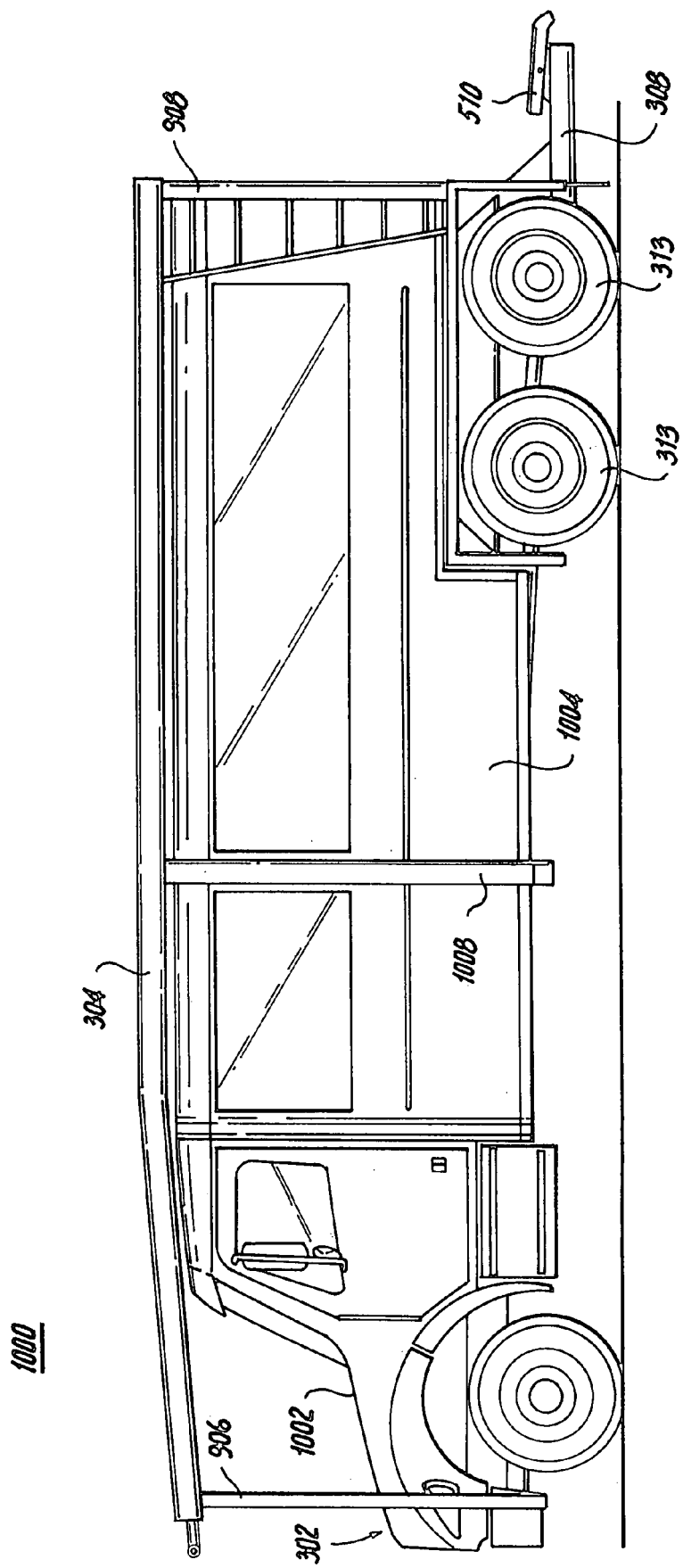
FIG. 10 depicts a side view of still another embodiment of the invention.

FIG. 10 depicts a side view of still another embodiment 1000 of the invention. The embodiment 1000 includes a tractor 302 having a driver cabin 1002, a passenger cabin 1004, and the lower fifth wheel 510 mounted to the drop frame 308. The drop frame 308 is behind and below the tandem 313. In addition, embodiment 1000 includes a head-rack 304, front support guard 906, intermediate support guard 1008, and rear support guard 908. It is appreciated that the invention can use more or less intermediate support guards 1008. The embodiment 1000 depicted in FIG. 10 operates similarly as the embodiment 600 depicted in FIG. 6 except that no wall separates driver cabin 1002 from passenger cabin 1004. Additionally optional front support guard 906, intermediate support guard 1008, and rear support guard 905 are provided.

Figure 11:
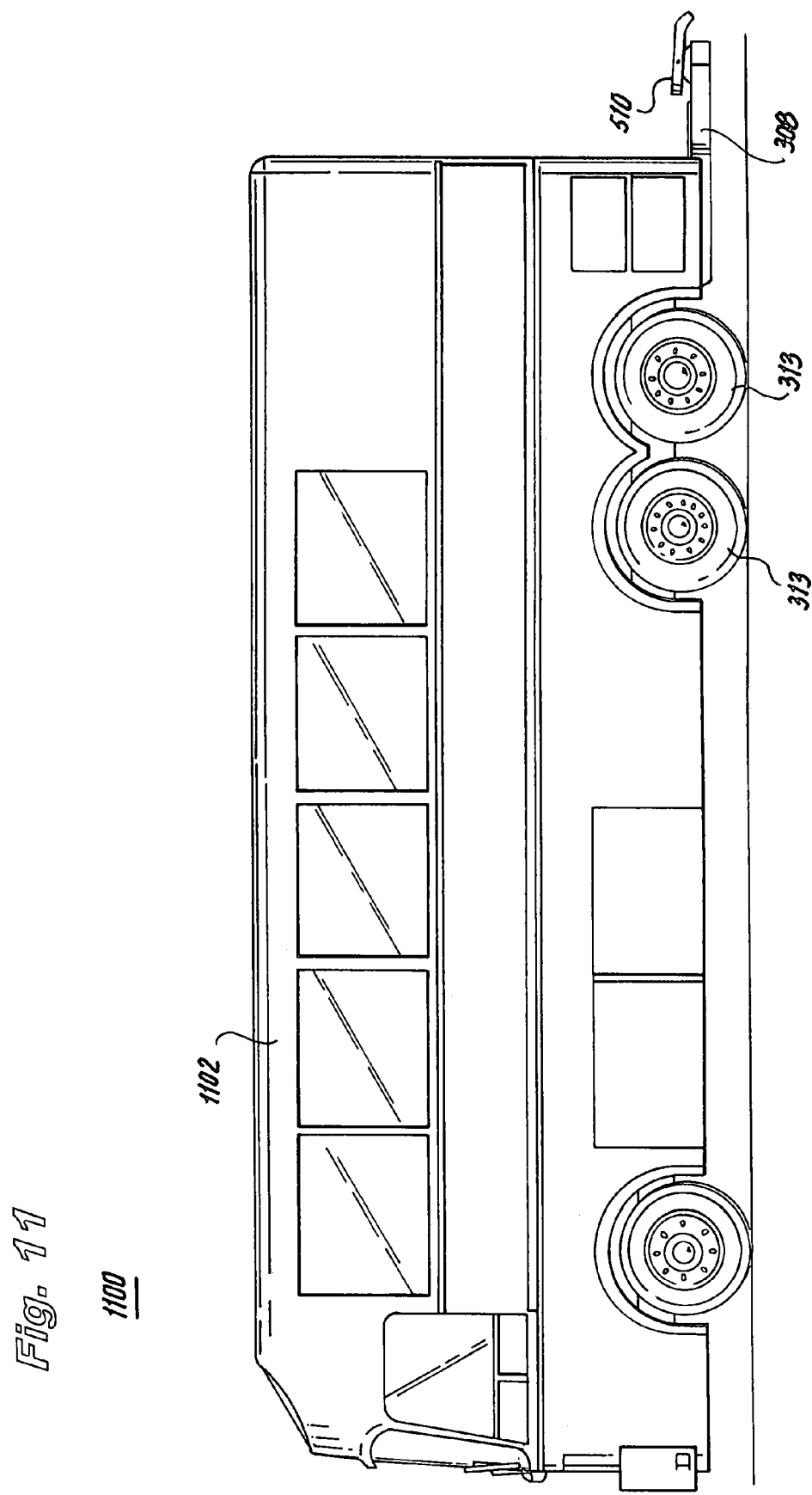
FIG. 11 depicts a side view of a further embodiment of the invention.

FIG. 11 depicts a side view of a further embodiment 1100 of the invention. Embodiment 1100 is a bus 1102 having the lower fifth wheel 510 mounted to the drop frame 308. The drop frame 308 and lower fifth wheel 510 are behind and below the tandem 313.

Figure 12:
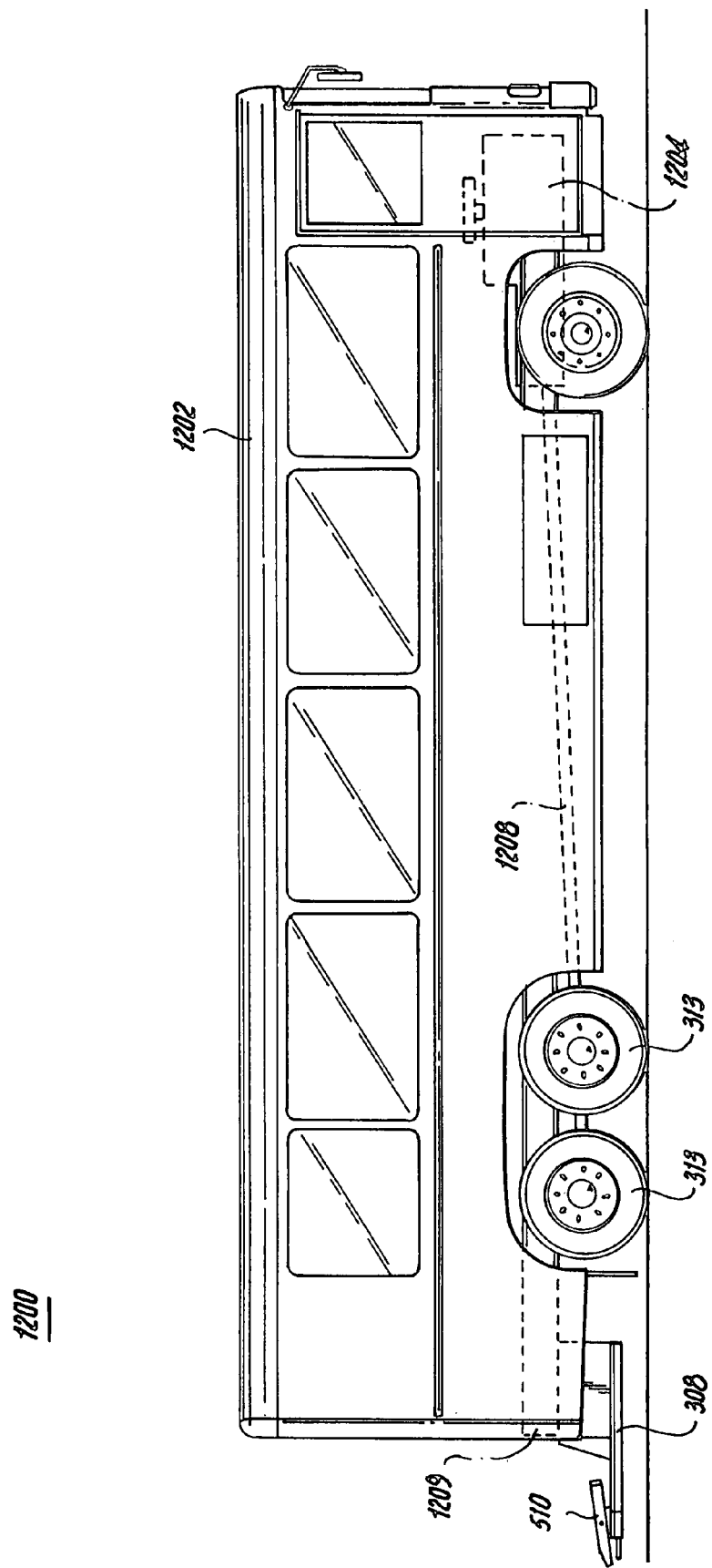
FIG. 12 depicts a side view of a different embodiment of the invention.

FIG. 12 depicts a side view of a different embodiment 1200 of the invention. Typically the engine in many buses is located in the rear of the bus. Embodiment 1200 utilizes a bus 1202 having an engine 1204 mounted towards the front of the bus 1202. A drive shaft 1208 extends from the engine 1204 to the tandem 313. The lower fifth wheel 510 mounted to the drop frame 308. The lower fifth wheel 510 and drop frame 308 is mounted to the frame 1209 behind and below the tandem 313.

Figure 13:
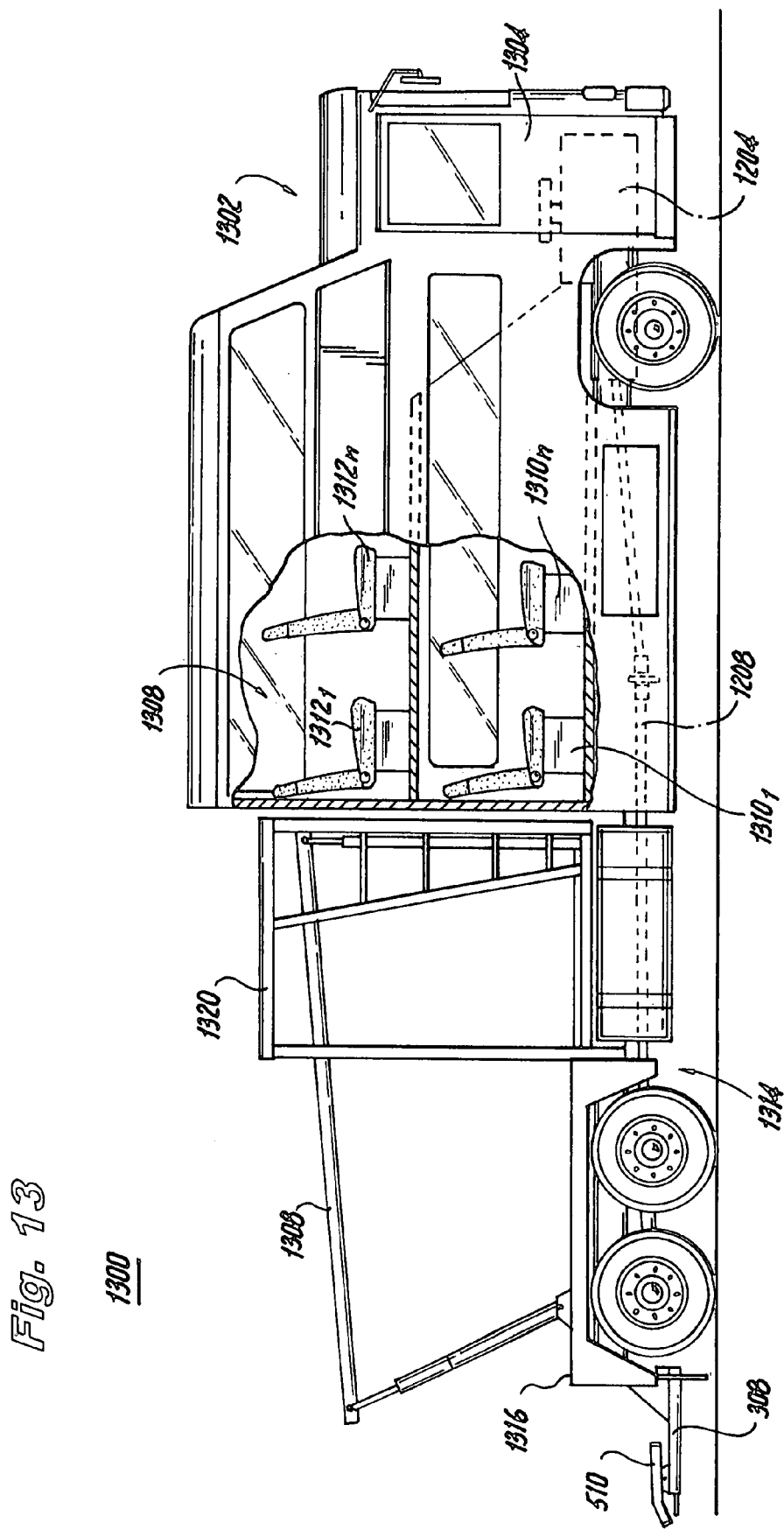
FIG. 13 depicts a side view of yet another embodiment of the invention.

FIG. 13 depicts a side view of yet another embodiment 1300 of the invention. Embodiment 1300 depicts a bus as the tractor 1302. A front portion of the tractor 1302 is a passenger compartment while a second portion 1314 of the tractor 1302 houses cargo (e.g., vehicle(s)). The tractor 1302 has a first passenger level 1306 and a second level 1308. The first passenger level 1306 contains seats $1310_1$-$1310_n$. The second passenger level 1308 contains seats $1312_1$-$1312_n$.

The second portion 1314 includes a deck 1318 with structural brace 1320 and a substantially flat surface 1316 for cargo (e.g., a vehicle(s)). The deck 1318 can be lowered and raised for the placement of cargo (e.g., a vehicle(s)). Although the second portion 1314 is depicted as including a deck 1318, it is appreciated that other embodiments of the invention do not utilize a deck 1318 and that yet other embodiments can enclose the second portion 1314.

Figure 14:
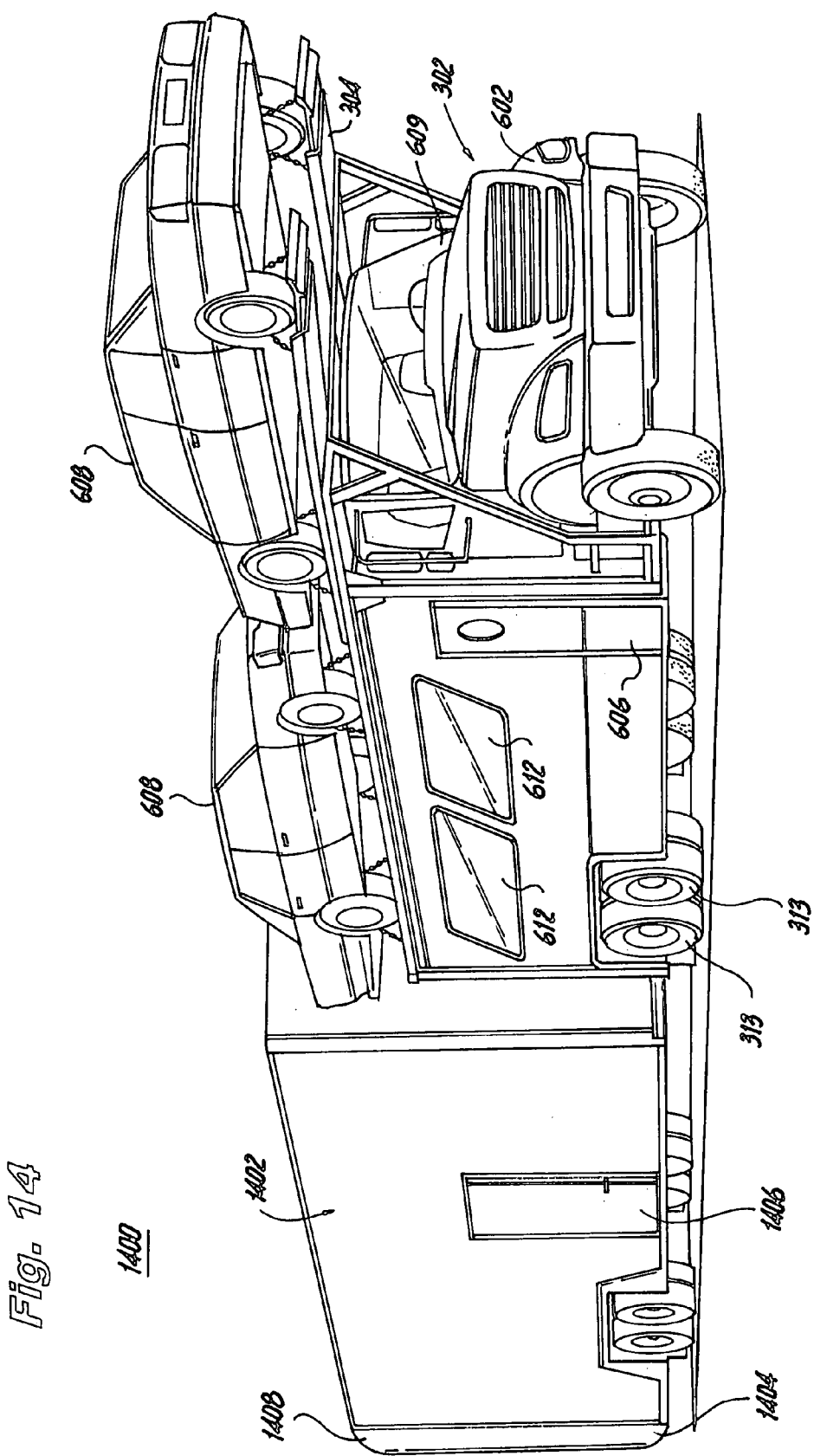
FIG. 14 depicts a side perspective view of another embodiment of the invention.

FIG. 14 depicts a side perspective view of another embodiment 1400 of the invention. The tractor 302 operates as described with respect to FIG. 6. In addition, embodiment 1400 also depicts an enclosed trailer 1402 coupled to the tractor 302 via the lower fifth wheel. The trailer 1402 includes a pivotable ramp 1404 and a side door 1406.

In one embodiment, the pivotable ramp 1404 pivots at pivot point 1408 (i.e., pivot point 1410 is elevated) so that cargo (e.g., a vehicle(s)) may be positioned on the head-rack 304, and/or inside the trailer 1402

In addition, the head-rack 304 is depicted as being open (i.e., allowing exposure of the cargo to external elements). However, it is appreciated that the head-rack 304 can be enclosed (i.e., covered for protection against external elements).

While the foregoing is directed to embodiments of this invention, other and further embodiments of the invention may be devised without departing from the basic scope thereof, and the scope thereof is determined by the claims that follow.

What is claimed is:

1. A transport system comprising:
    a tractor chassis;
    a body mounted on said chassis, said body comprising a driver cabin having a driver seat and a co-driver seat and a separate extended passenger cabin located behind said driver cabin for transporting passengers in at least a row of seats excluding the driver seat and the co-driver seat;
    said separate extended passenger cabin having an internal staircase enclosed by an exterior door;
    a tandem coupled to and under said chassis;
    a head rack mounted on top of said body;
    a vehicle carrier rack on said chassis behind and substantially level with said body and over said tandem;
    a drop frame secured to said chassis wherein said drop frame is below and behind said tandem; and
    a fifth wheel secured to said drop frame.

2. The system of claim 1 wherein said driver cabin includes a passageway to said passenger cabin.

3. The system of claim 2 wherein said drop frame includes a left side and a right side with a stopper block on each of said left and right sides.

4. The system of claim 1 wherein said head rack is enclosed.

5. The system of claim 1 wherein said passenger cabin has an upper level and a lower level.

6. The system of claim 5 further comprising a cargo area behind said passenger cabin and supported by said chassis.

7. The system of claim 6 wherein said cargo area is enclosed.

8. The system of claim 1 further comprising a trailer coupled to said fifth wheel.

9. The system of claim 8 wherein said trailer includes an open carrier frame.

10. The system of claim 8 wherein said trailer is enclosed.

11. The system of claim 1 wherein said driver cabin and said passenger cabin together form a unitary compartment.

12. The system of claim 1 wherein said body comprises a crew cab.

13. The system of claim 12 wherein said crew cab has an air ride suspension.

14. The system of claim 1 further comprising an air ride suspension for said passenger cabin and said driver cabin.

* * * * *